| United States Patent [19] | [11] | 4,447,978 |
|---|---|---|
| Robison | [45] | May 15, 1984 |

[54] REACTION GILL NET

[76] Inventor: Thomas E. Robison, 3661 Airport Blvd. - Apt. 134, Mobile, Ala. 36608

[21] Appl. No.: 409,353

[22] Filed: Aug. 19, 1982

Related U.S. Application Data

[62] Division of Ser. No. 197,746, Oct. 16, 1980, Pat. No. 4,373,286.

[51] Int. Cl.$^3$ .................... A01K 69/10; A01K 74/00
[52] U.S. Cl. ............................ 43/10; 43/102; 43/105
[58] Field of Search ............ 43/7, 10, 100–102, 43/105–106, 44.99

[56] References Cited

U.S. PATENT DOCUMENTS

| 3,741 | 9/1844 | Carr et al. | 43/100 |
| 1,407,744 | 2/1922 | Ftyklo | 43/100 |
| 2,728,164 | 12/1955 | Mears | 43/7 X |
| 3,176,427 | 4/1965 | Hershey | 43/44.99 |
| 4,156,984 | 6/1979 | Kinser, Sr. | 43/105 |
| 4,237,646 | 12/1980 | Mims | 43/10 |

FOREIGN PATENT DOCUMENTS

| 651724 | 2/1929 | France | 43/10 |
| 1226912 | 3/1971 | United Kingdom | 43/44.99 |

Primary Examiner—Frederick R. Schmidt
Assistant Examiner—Debra S. Meislin
Attorney, Agent, or Firm—Cushman, Darby & Cushman

[57] ABSTRACT

Fish are captured utilizing a chain reaction of larger fish feeding on smaller fish. A bait-enclosing structure is mounted within a frame, and a first net is provided surrounding and substantially concentric with the bait-enclosing structure. The first net has openings formed therein large enough to allow small fish to insert their heads through the openings in an attempt to feed on the bait and catch their gills on the net if withdrawal is attempted. The assembly is lowered into a body of water, and after a predetermined time period a desired number of fish are trapped within the assembly utilizing a second net surrounding the first net, and then the assembly is raised to the surface. Entrapment may be provided by providing the second net having larger openings than the first net and concentric therewith, so that fish attempting to feed on fish caught by the first net will be caught by the second net. Alternatively, the second net may be provided as a movable net, and once fish swim into the volume defined by the assembly to feed on fish caught in the first net, the movable net is activated to trap the fish within the volume.

3 Claims, 6 Drawing Figures

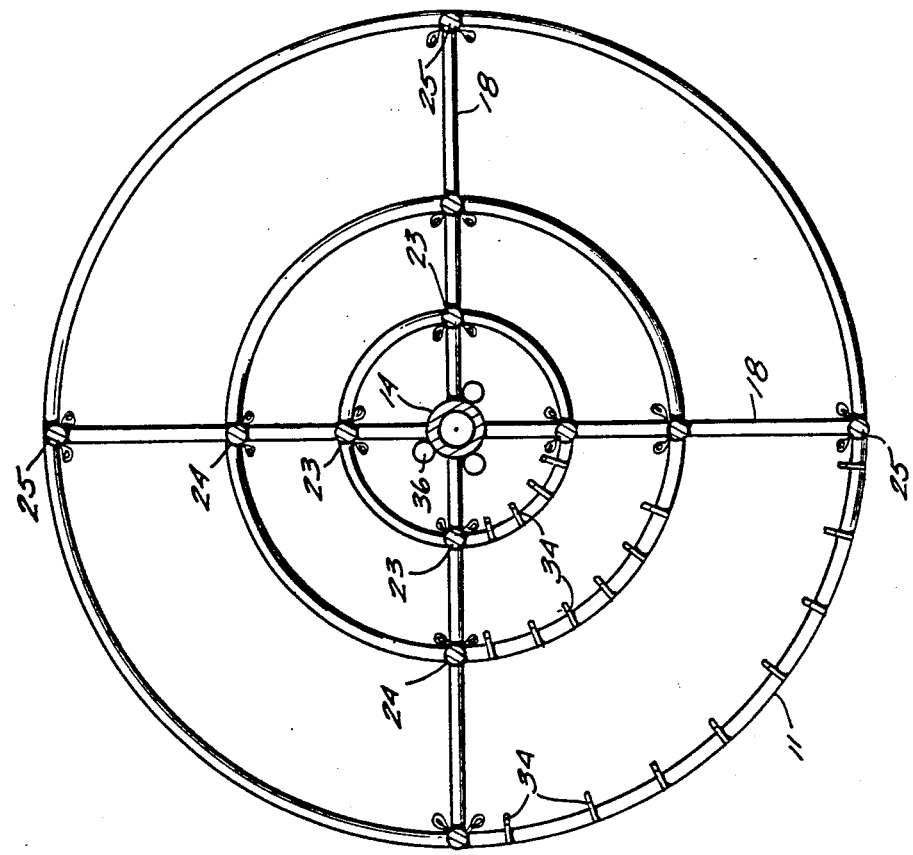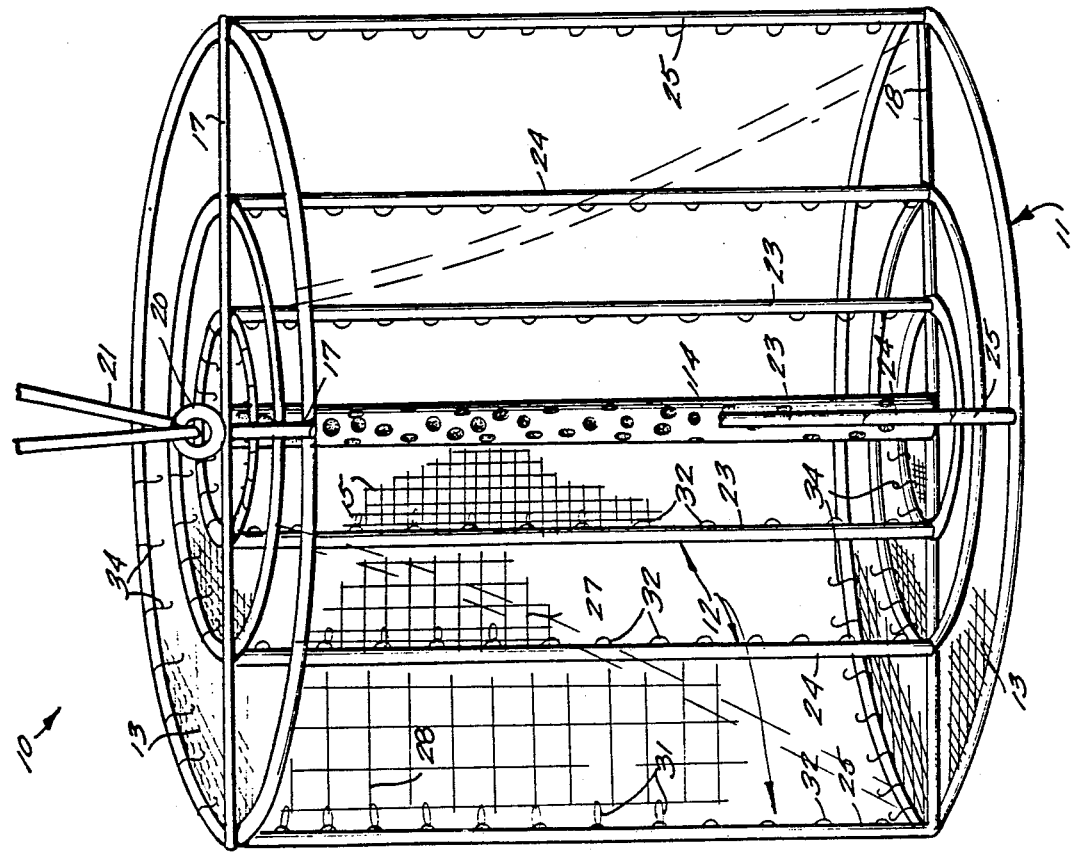

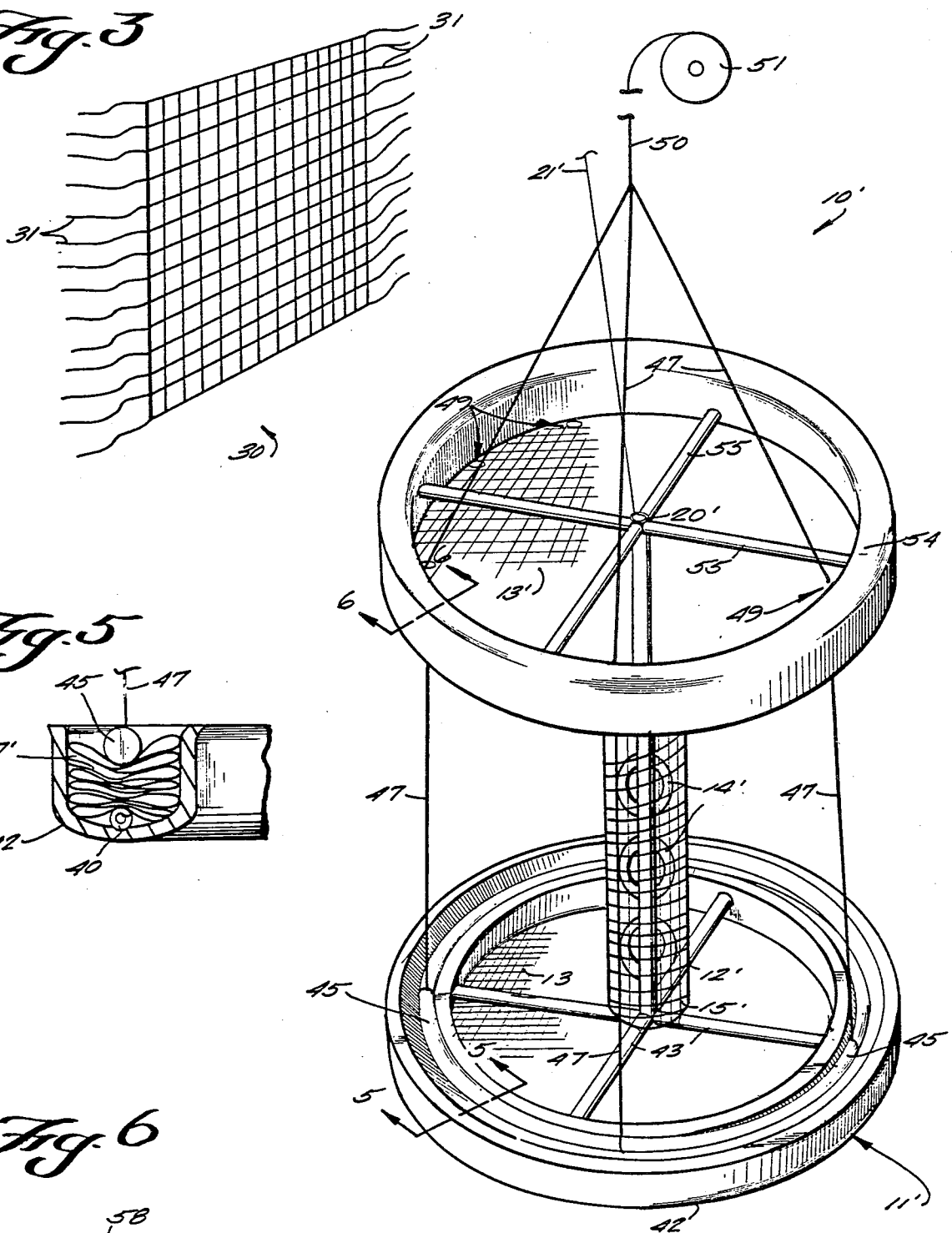
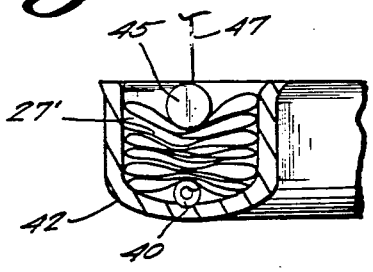
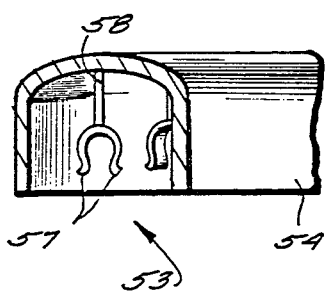
Fig. 3
Fig. 5
Fig. 6
Fig. 4

REACTION GILL NET

CROSS-REFERENCE TO RELATED APPLICATION

This application is a divisional of my application Ser. No. 197,746, filed Oct. 16, 1980, now U.S. Pat. No. 4,373,286.

BACKGROUND AND SUMMARY OF THE INVENTION

It is a known natural phenomenon that larger fish feed on smaller fish in aquatic food chains. According to the present invention, it is desired to take advantage of this chain reaction in order to utilize a minimum amount of bait yet effectively attract and capture commercially desirable species. While the present invention has a wide variety of uses, it is particularly adaptable for use in the off-shore commercial fishing industry for taking of red snapper, grouper, and other similar deep water bottom-feeding fish.

The basic principle according to the present invention is to attract relatively small fish with a bait mounted in an assembly that is lowered under water, trap the small fish in an area adjacent the bait, and subsequently use the smaller fish as bait for larger commercially desirable species. The utilization of such live, smaller species which have been trapped is considered to be an effective way of attracting commercially desirable species that may be in the area.

According to one aspect of the present invention, a gill net assembly is provided which comprises a frame, a bait-enclosing structure, and a first net. The first net has openings formed therein large enough to allow small fish to insert their heads through the openings in an attempt to feed on the bait in the bait-enclosing structure and catch their gills on the net if withdrawal from the openings is attempted. The assembly further comprises means for mounting the first net to the frame adjacent a central portion thereof and surrounding the bait-enclosing structure.

According to one embodiment of the present invention, the net assembly includes a second net having openings large enough to allow small fish which would be caught by the first net to pass completely therethrough, but small enough to allow larger fish to insert their heads through the second net openings and catch their gills on the second net if withdrawal from the openings is attempted. Means are provided for mounting the second net to the frame substantially concentrically with the first net, and radially outwardly therefrom. A further series of nets concentric with the second net and having progressively larger openings may also be provided depending upon the desired extent of the "chain reaction". The frame may comprise a plurality of bars defining concentric cylindrical peripheries, with each net formed in sections and attached to the bars to define a complete net. The provision of the net in sections makes it easier to remove the fish and to replace torn portions of the net.

According to a second embodiment of the assembly according to the present invention, a second net is provided concentric with the first net and means are provided for mounting the second net to a bottom component of the frame, and for mounting the second net for movement with respect to the top component of the frame. Movement of the movable net is from a baiting position allowing free access to the volume defined by the top and bottom frame components, to a capturing position wherein the second net encloses the volume defined by the frame components, with actuating means being provided operable from a position remote from the assembly for effecting movement of the second net from the baiting to the capturing positions thereof. The movable net may be mounted in a trough formed with the bottom frame component when the net is in a collapsed position, and may be moved upwardly by a plurality of strands attached to the top of the net into contact with clamp means mounted on the top frame component, which clamp means will hold the net in place in its capturing position.

According to another aspect of the present invention, a method of capturing fish utilizing the above-described general assembly is provided. The method comprises the steps of: (a) Disposing bait within the bait-enclosing structure. (b) Lowering the assembly into a body of water containing fish. (c) Waiting a time period sufficient to entrap the desired number of fish feeding upon small fish having their gills caught in the first net. The amount of this waiting time can be determined from trial-and-error, experience, or utilizing undersea camera equipment. (d) Entrapping the desired number of fish within the assembly utilizing a second net surrounding the first net. The entrapment may either be accomplished passively by utilizing one or more concentric surrounding gill nets having progressively larger openings therein, or actively by moving the second net from a baiting position to an entrapping position. And (e) raising the assembly, with entrapped fish, to the surface. The method may also comprise the further steps of removing entrapped fish from the assembly on the surface and again lowering the assembly into the water with re-baiting of the bait-enclosing structure being unnecessary.

It is the primary object of the present invention to provide a structure and method facilitating the efficient capture of fish taking advantage of the natural phenomena of larger fish feeding on smaller fish in a chain reaction. This and other objects of the present invention will become clear from an inspection of the detailed description of the invention, and from the appended claims.

BRIEF DESCRIPTION OF THE DRAWINGS

FIG. 1 is a perspective view of an exemplary assembly according to the present invention;

FIG. 2 is a horizontal cross-sectional view of the assembly of FIG. 1;

FIG. 3 is a perspective view of a net section utilizable with the assembly of FIG. 1;

FIG. 4 is a perspective view of a second embodiment of an exemplary assembly according to the present invention;

FIG. 5 is a detailed cross-sectional view taken along lines 5—5 of FIG. 4; and

FIG. 6 is a detailed cross-sectional view of the structure of FIG. 4 taken along lines 6—6 thereof.

DETAILED DESCRIPTION OF THE DRAWINGS

FIGS. 1 through 3 illustrate an exemplary first embodiment of an assembly according to the present invention, while FIGS. 4 through 6 illustrate a second embodiment of an assembly according to the present invention. The two embodiments include as common features the following structures, the structures being indicated by the same reference numeral in the two embodiments except that the reference numerals in the FIGS. 4 through 6 are followed by a "'": An open frame, which comprises a top frame component 10, 10', a bottom frame component 11, 11', and at least one axially extending frame component 12, 12' interconnecting the top and bottom frame components. The top and bottom frame components 10, 10' and 11, 11', respectively, are preferably covered with netting 13, 13', although under some circumstances they may be solid, perforated, or otherwise constructed. The netting 13, 13' may comprise expanded stainless steel ½" mesh ⅜" thick.

The assemblies of both embodiments also include a bait-enclosing structure 14, 14'. The bait-enclosing structure of FIG. 1 comprises a perforated metal cylinder, with the bait being disposed within the cylinder. The bait-enclosing structure 14' includes a flexible perforated cylinder filled with bait and tied to the post 12'. Any number of other structures could be utilized, including a bait-enclosing central net having openings small enough to prevent bait passing therethrough. Each of the assemblies of the various embodiments also includes a first net 15, 15'. The first net has openings formed therein large enough to allow small fish to insert their heads through the openings in an attempt to feed on bait in the bait-enclosing structure 14, 14' and catch their gills on the net if withdrawal from the openings is attempted. Means are provided for mounting the first nets 15, 15' with respect to the frames adjacent a central portion thereof and surrounding the bait-enclosing structure 14, as illustrated in the drawings. Note that in FIG. 1 the majority of the nets illustrated therein are cut-away for clarity of illustration. Any suitable structure can be utilized for mounting the first nets 15, 15' to the respective frames 10, 10', such as hooks, ties, latches, snaps, etc.

Both embodiments of the invention also include a second net surrounding the first net 15, 15'. However, the construction, mounting, and operation of the second nets differ substantially.

In the FIGS. 1 through 3 embodiment, the upper frame component 10 preferably comprises a plurality of concentric rings, interconnected by radially extending bars 17, while the bottom component also comprises a plurality of concentric rings which are interconnected by radially extending bars 18. An eyelet 20 or the like is mounted to a central portion of the top frame component 10 for receipt of a cable 21 which leads up to the surface and is utilized to effect lowering and raising of the assembly. The frame further comprises as the axially extending component a plurality of sets of a plurality of bars each, each set of a plurality of bars disposed to define the exterior surface of a cylinder or cone, and the respective sets being substantially concentric. For instance, as illustrated in FIGS. 1 and 2, a first set of bars 23 is provided connected between the smallest diameter ring of the upper and lower frame components 10, 11 and defining the periphery of a cylinder. The second set of bars includes the bars 24, and a third set of bars includes the bars 25.

In the FIGS. 1 through 3 embodiment, the second net is indicated by reference numeral 27. The second net surrounds the first net 15 and is substantially concentric therewith, and the openings in the second net 27 are large enough to allow small fish whose gills will be caught in the net 15 to pass therethrough, while being small enough to catch the gills of larger fish attempting to feed upon fish caught by the first net 15. Similarly, a third net 28 is provided surrounding and substantially concentric with the second net 27, and having openings formed therein larger than the openings in the net 27 to allow passage of fish through the openings that will be caught by net 27, but small enough to catch fish by their gills that are attempting to feed upon fish caught by net 27. Any number of nets may be provided formed in such an arrangement, preferably the radially outermost net having openings formed therein of sufficient size to catch the fish most desirably caught. For instance where it is desired to catch snapper of about 3-6 pounds, the openings in net 28 will be gauged accordingly.

In the preferred embodiment illustrated in FIGS. 1 through 3, it is preferred to form the nets 15, 27, 28 in sections. A typical section of a net 15, 27 or 28 is illustrated generally at 30 in FIG. 3. The net section 30, in the illustrated embodiment, preferably comprises one-quarter of a circle, and there are four sections 30 in a set making up one of the nets 15, 27, 28. By forming the nets in sections, it is easier to remove fish and to replace torn portions of the net.

Any suitable means may be utilized for connecting the net sections to the frame components. In the embodiment illustrated in the drawings, each net section 30 is formed with a plurality of drawstrings or ropes 31 along the side edges thereof. These drawstrings cooperate with eyelets 32 formed along the length of the various axial bars 23 through 25, the strings 31 being inserted through the eyelets and then the net section 30 being pulled taut and the strings 31 tied off. The upper and lower portions of the nets may be affixed to the frame components by hooks 34 or the like formed on cooperating portions of the upper and lower frame components 10, 11, respectively.

Where it is desirable to provide the bait-enclosing structure as a bait bag tied around a solid wall center post corresponding to the perforated cylinder 14, a plurality of rings 36 may be welded to the central solid wall bar, as illustrated in FIG. 2. These rings 36 would be disposed in a spiral fashion around the circumference of the solid-walled central bar, one at the top and one at the bottom and several inbetween. The bait bag could be tied to the rings 36 adjacent the central solid-walled pole corresponding to the perforated cylinder 14.

In the FIGS. 4 through 6 embodiment, the second net is illustated generally at 27', and comprises a circumferentially continuous net adapted to surround the first net 15', concentric therewith. The second net 27' is mounted to be movable between a baiting position (illustrated in FIG. 4) wherein free access by fish to the volume defined by the frame components 10', 11' is provided, to a second position wherein the net 27' completely encloses the volume defined by the frame components 10', 11', extending between the components 10', 11' around the entire periphery thereof. Such mounting of the second net 27' is provided by tying or otherwise attaching the bottom of the second net 27' to a ring 40 mounted in the bottom of a trough 42 forming a part of the bottom component 11'. The trough 42 extends around the circumference of the bottom component 11' being attached to radially extending support bars 43, and ultimately to the central support bar 12'. The trough 42 encompasses the net 27' in the collapsed position thereof (see FIG. 5).

Mounting of the second net 27' for movement with respect to the upper frame component 10' is further accomplished by providing a solid ring 45 extending around the top of the net 27', and a plurality of strands 47 connected to the ring 45. The strands may be wire, rope, string, tape, or like structures. Means are provided for guiding movement of the strands 27 with respect to the top frame component 10', such as a plurality of rings 49 formed in the net 13' of the top frame component 10' (see FIG. 4) which allow passage of the strands 47 therethrough. Actuating means are provided operable from a position remote from the assembly for effecting movement of the net from its baiting position (FIG. 4) to its capturing position. The actuating means preferably includes an actuator strand 50 operatively connected to the strands 47 at an end of each opposite the end connecting the strands to the net ring 45. The actuator strands may be pulled from the surface by a high-speed winch, illustrated schematically at 51 in FIG. 4, to effect movement of the net.

It is desirable to provide a structure for holding the net 27' in place once it has been moved to its capturing position. For this purpose, clamping means, illustrated generally at 53 (see FIG. 6) are provided associated with a peripheral circumferential inverted channel member 54 forming part of the upper frame component 10', and connected by radially extending bars 55 or the like to the central post 12'. As illustrated in FIG. 6, the clamp means may comprise a pair of spring arms 57 mounted by a stem 58 to the interior surface of the channel 54, spring arms 57 being constructed and dimensioned so that they will be cammed apart when the net upper ring 45 is brought into contact therewith, and then will be moved back toward each other under the influence of their inherent spring bias to clamp the ring 45 therebetween. Any desired number of clamps may be disposed around the circumference of the channel 54.

A method of capturing fish according to the present invention, utilizing the apparatus heretofore described, comprises the following steps:

(a) Bait, such as shrimp, is disposed within the bait-enclosing structure 14, 14'.

(b) The assembly is lowered into a body of water containing fish, the assembly being in communication with the surface via cable 21. Small fish will attempt to feed upon the bait within the bait-enclosing structure 14, 14', and in doing so will insert their heads through the openings in the first net 15, 15'. They will then catch their gills on the net if withdrawal from the openings is attempted. Larger fish will then swim toward the volume enclosed by the frame components 10, 11 or 10', 11', and attempt to feed upon the small fish trapped by the first net 15, 15'.

(c) After passage of a sufficient period of time to entrap a desired number of fish feeding upon small fish having their gills caught in the first net 15, 15', (d) the desired number of fish is entrapped within the assembly utilizing a second net 27 (or 28), 27' surrounding the first net. The appropriate time period for step (c) may be determined by trial-and-error, experience, or by utilizing underwater surveillance equipment. Step (d) is practiced in a different manner depending upon which embodiment of the assembly is utilized.

When the FIGS. 1 through 3 embodiment of the assembly is utilized, step (d) is practiced without any active steps being necessary since the dimensioning of the openings in the second net 27 (or third or subsequent nets 28, etc.) are designed to capture by the gills fish larger than the fish in the first net. When the embodiment illustrated in FIGS. 4 through 6 is utilized, step (d) is practiced by actuating winch 51 to pull up on cable 50, which in turn pulls up strands 47 causing net 27' to move from its collapsed position in trough 42 (FIG. 5) to an entrapping position extending around the entire periphery of the frame components 10', 11'. When the strands 47 are drawn taut, the net ring 4 will be moved into an operative association with the clamp means 53, causing the spring fingers 57 of each clamp to be moved apart and to spring back to catch the ring 45 therein.

After the desired number of fish are entrapped, the method comprises the further step of (e) raising the assembly, with entrapped fish, to the surface. This is accomplished merely by taking in cable 21, 21'. Once the assembly is on the surface, the entrapped fish may be removed from the assembly, and it is then possible to again lower the assembly into the water, with no re-baiting of the bait-enclosing structure normally being necessary.

It will thus be seen that according to the present invention an effective net assembly and method have been provided for capturing fish.

While the invention has been herein shown and described in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. A gill net assembly comprising
   a frame having open sides, an open top, and an open bottom;
   a bait-enclosing structure mounted to a central portion of said frame;
   a first net having openings formed therein large enough to allow small fish to insert their heads through the openings in an attempt to feed on bait in the bait-enclosing structure and catch their gills on the net if withdrawal from the opening is attempted;
   means for mounting said first net to said from adjacent a central portion thereof wherein said first net encloses the sides of said frame and surrounding said bait-enclosing structure;
   a second net, said second net having openings large enough to allow small fish which would be caught by said first net to pass completely therethrough, but small enough to allow larger fish to insert their heads through said second net openings and catch their gills on the second net if withdrawal from the openings is attempted;
   means for mounting said second net to said frame and substantially concentrically with said first net, and radially outwardly therefrom, and enclosing the sides of said frame; and 2. An assembly as recited in claim 1 wherein said assembly is denser than water so that it may be lowered down into the water during use.

3. A gill net comprising: a frame comprising a bottom portion and a top portion, with at least one axial frame component interconnecting said top and bottom portions;
   a bait-enclosing structure;
   a first net having openings formed therein large enough to allow small fish to insert their heads through the openings in an attempt to feed on bait in the bait-enclosing structure and catch their gills on the net if withdrawal from the openings is attempted;

means for mounting said first net to said frame adjacent a central portion thereof and surrounding said bait-enclosing structure;

a second net, concentric with said first net;

means for operatively attaching said second net to said bottom frame component;

means for mounting said second net for movement with respect to said top frame component from a baiting position allowing free access to the volume defined by said top and bottom frame components, to a capturing position wherein said second net encloses the volume defined by said top and bottom frame components;

said second net including a ring affixed to the top thereof;

a plurality of pairs of spring arms mounted to said top frame portion with the spring arms of each pair being spaced from each other at a bottom thereof, facing said bottom frame component, said spring arms being shaped and dimensioned to receive said ring attached to the top of said second net when said second net is moved to said capturing position, and for clamping said second net in said capturing position; and actuating means operable from a position remote from said assembly for effecting movement of said second net from said baiting to said capturing positions thereof.

* * * * *